W. A. T. MÜLLER.
MEANS FOR COUPLING VEHICLES.
APPLICATION FILED MAY 27, 1911.
1,071,453.
Patented Aug. 26, 1913.
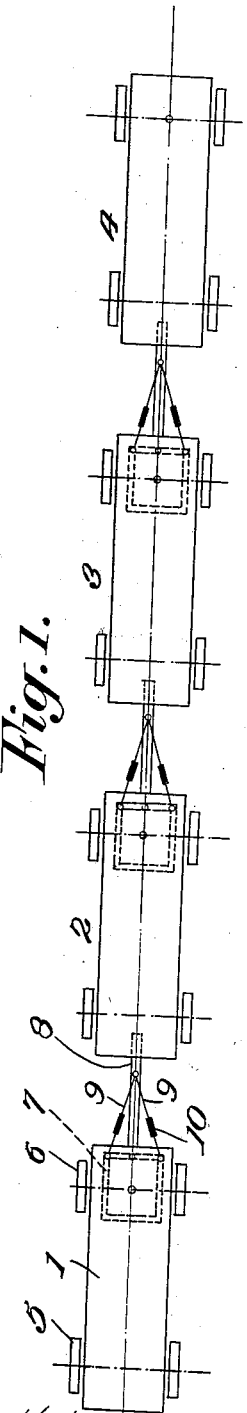
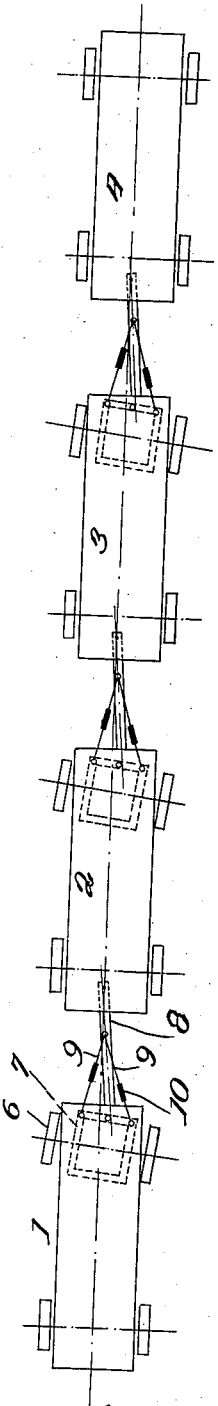
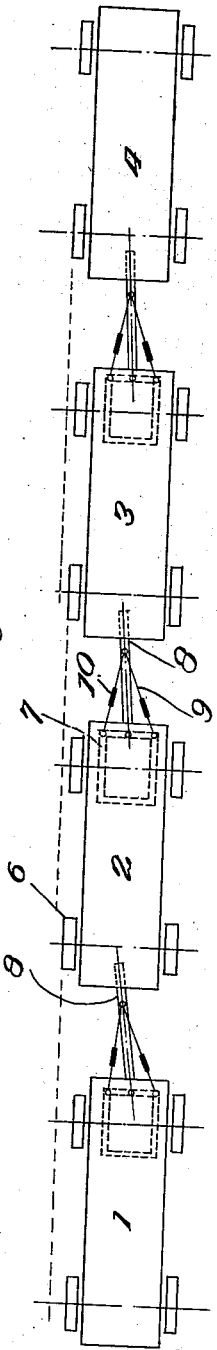
Witnesses:
Inventor:
Wilhelm Adolf Theodor Müller
Attorney.

UNITED STATES PATENT OFFICE.

WILHELM ADOLF THEODOR MÜLLER, OF BERLIN-STEGLITZ, GERMANY.

MEANS FOR COUPLING VEHICLES.

1,071,453.      Specification of Letters Patent.      Patented Aug. 26, 1913.

Application filed May 27, 1911. Serial No. 629,842.

*To all whom it may concern:*

Be it known that I, WILHELM ADOLF THEODOR MÜLLER, a subject of the German Emperor, and resident of Berlin-Steglitz, Germany, have invented certain new and useful Improvements in Means for Coupling Vehicles, of which the following is a specification.

This invention relates to improvements in means for coupling vehicles so as to cause the wheels of the succeeding vehicles in a train to pass in different tracks.

The invention also relates to the details of construction and arrangement of parts which will be hereinafter described, and particularly pointed out in the claims.

In the drawings: Figure 1 is a diagrammatic plan view illustrating my invention. Fig. 2 is a similar view, the coupling being adjusted to cause the wheels when the train is pulled to travel in different paths. Fig. 3 is a similar view but illustrating the position of the vehicles when force is applied to pull the train.

1, 2, 3, and 4, indicates vehicles: 5 and 6, the wheels thereof. The front wheels 6, turn with the usual fifth wheel construction, indicated at 7. Pivoted to each fifth wheel construction is a tongue 8. The forward end of the tongue is pivoted to the rear end of the vehicle ahead, as shown in the drawing. Secured to each pole near the forward end, are two diverging guys 9—9, the rear ends of which are pivoted to the front outer ends of the fifth wheel construction 7 of the vehicle from which the pole extends. To adjust the length of the guys 9—9 each one is provided with a turn buckle 10.

In use, the tongue of the rear vehicle is pivotally fastened to the rear of the vehicle ahead, as shown in Fig. 1. Then the turn buckles are adjusted so as to partially rotate the fifth wheel construction 7, as shown in Fig. 2. Now when the train of vehicles are drawn over the road, the pull exerted on the guys 9—9, and tongues, will cause each succeeding vehicle to be displaced from a center line drawn through the first vehicle, as indicated in Fig. 3, consequently avoiding the formation of ruts in the roadway, as would occur if all the wheels of the vehicles traveled in the same path. By adjusting the turn buckles the alinement of the vehicles may be varied. Of course the turn buckles can be adjusted so as to cause the position of the vehicles to be such that they will be located on the opposite of a medial line to that shown in the drawing.

What I claim is:

1. In combination, a train of vehicles, each vehicle including rear wheels, fifth wheel construction, front wheels movable with the fifth wheel construction, a tongue pivoted to swing horizontally on the front of each fifth wheel construction, each tongue extending to and pivoted to swing horizontally at its forward end to the rear of the vehicle ahead, and guys extending from each tongue and secured to the fifth wheel construction to which the tongue is secured, one of said guys being shorter than the other to cause the wheels of the succeeding vehicle in the train to travel in a different path than the wheels of the vehicle ahead.

2. In combination, a train of vehicles, each vehicle including rear wheels, fifth wheel construction, front wheels movable with the fifth wheel construction, a tongue pivoted to swing horizontally on the front of each fifth wheel construction, each tongue extending to and pivoted to swing horizontally at its forward end to the rear of the vehicle ahead, guys extending from each tongue and secured to the fifth wheel construction to which the tongue is secured, adjusting devices on the guys to form one shorter than the other to cause the wheels of the succeeding vehicle in the train to travel in a different path than the wheels of the vehicles ahead.

In testimony whereof I have hereunto set my hand in presence of two witnesses.

WILHELM ADOLF THEODOR MÜLLER.

Witnesses:
    HENRY HASPER,
    WOLDEMAR HAUPT.